(12) United States Patent
Gottin et al.

(10) Patent No.: US 10,977,177 B2
(45) Date of Patent: Apr. 13, 2021

(54) DETERMINING PRE-FETCHING PER STORAGE UNIT ON A STORAGE SYSTEM

(71) Applicant: EMC IP Holding Company LLC, Hopkinton, MA (US)

(72) Inventors: Vinicius Gottin, Rio de Janeiro (BR); Tiago Calmon, Rio de Janeiro (BR); Romulo D. Pinho, Niterói (BR); Jonas F. Dias, Rio de Janeiro (BR); Eduardo Sousa, Niterói (BR); Roberto Nery Stelling Neto, Rio de Janeiro (BR); Hugo de Oliveira Barbalho, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 97 days.

(21) Appl. No.: 16/508,347

(22) Filed: Jul. 11, 2019

(65) Prior Publication Data
US 2021/0011851 A1   Jan. 14, 2021

(51) Int. Cl.
  *G06F 12/08*     (2016.01)
  *G06F 12/0862*   (2016.01)
  *G06F 12/0866*   (2016.01)

(52) U.S. Cl.
  CPC ...... *G06F 12/0862* (2013.01); *G06F 12/0866* (2013.01); *G06F 2212/602* (2013.01)

(58) Field of Classification Search
  None
  See application file for complete search history.

(56) References Cited

U.S. PATENT DOCUMENTS

| | | | | |
|---|---|---|---|---|
| 8,429,351 B1* | 4/2013 | Yu | ........................ | G06F 12/0862 711/132 |
| 9,547,459 B1* | 1/2017 | BenHanokh | .......... | G06F 3/0614 |
| 10,001,927 B1* | 6/2018 | Trachtman | ............ | G06F 3/0665 |
| 2008/0229027 A1* | 9/2008 | Shioya | ................ | G06F 12/0862 711/137 |
| 2008/0229071 A1* | 9/2008 | Shioya | ................ | G06F 12/0862 712/207 |
| 2010/0199036 A1* | 8/2010 | Siewert | ................. | G06F 3/0613 711/112 |
| 2011/0202717 A1* | 8/2011 | Kezuka | ................... | G06F 3/061 711/113 |
| 2014/0052928 A1* | 2/2014 | Shimoi | ............... | G06F 12/0862 711/137 |

* cited by examiner

*Primary Examiner* — Kaushikkumar M Patel
(74) *Attorney, Agent, or Firm* — Muirhead and Saturnelli, LLC

(57) ABSTRACT

A pre-fetching technique determines what data, if any, to pre-fetch on a per-logical storage unit basis. For a given logical storage unit, what, if any, data to prefetch is based at least in part on a collective sequential proximity of the most recently requested pages of the logical storage unit. Determining what, if any, data to pre-fetch for a logical storage unit may include determining a value for a proximity metric indicative of the collective sequential proximity of the most recently requested pages, comparing the value to a predetermined proximity threshold value, and determining whether to pre-fetch one or more pages of the logical storage unit based on the result of the comparison. A data structure may be maintained that includes most recently requested pages for one or more logical storage units. This data structure may be a table.

20 Claims, 12 Drawing Sheets

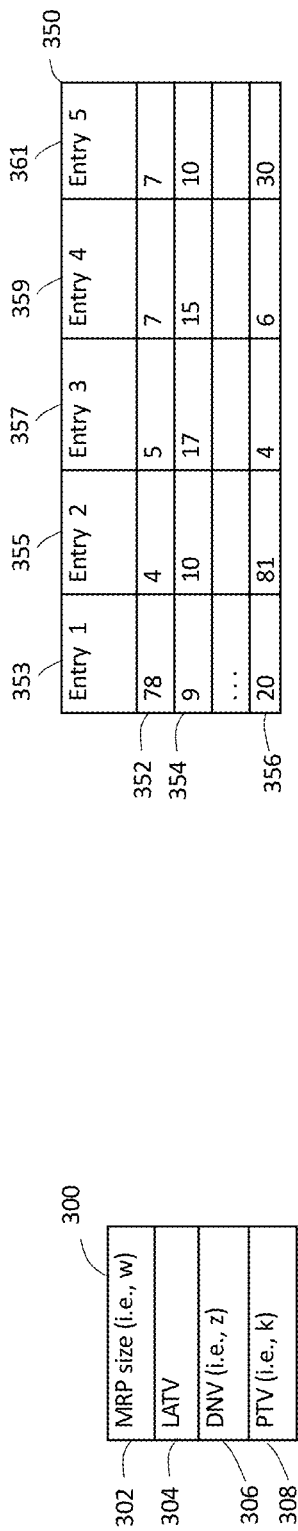
FIG. 3B
FIG. 3A
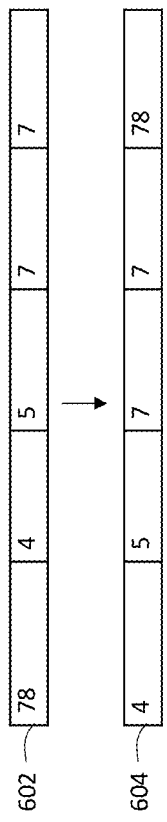
FIG. 6

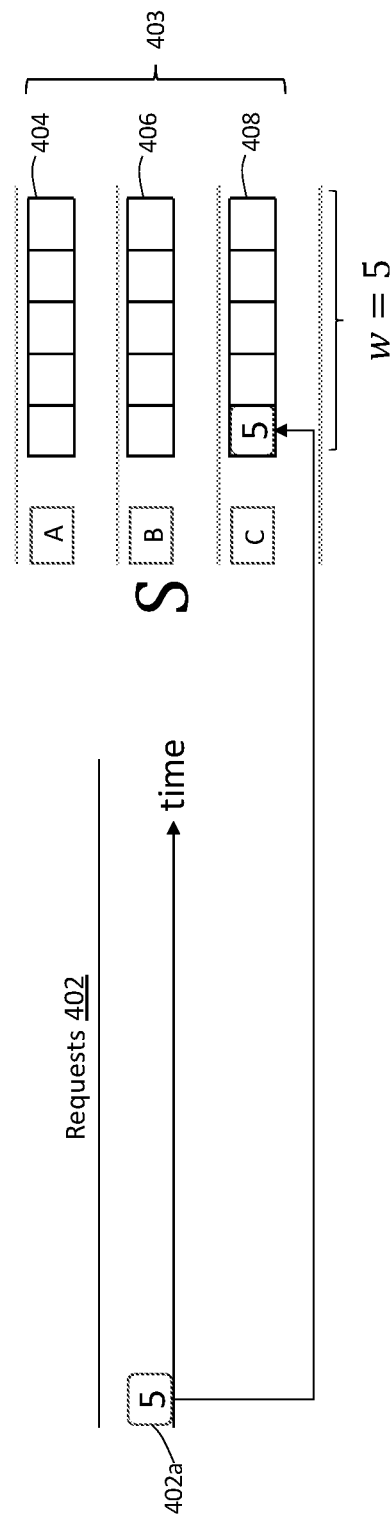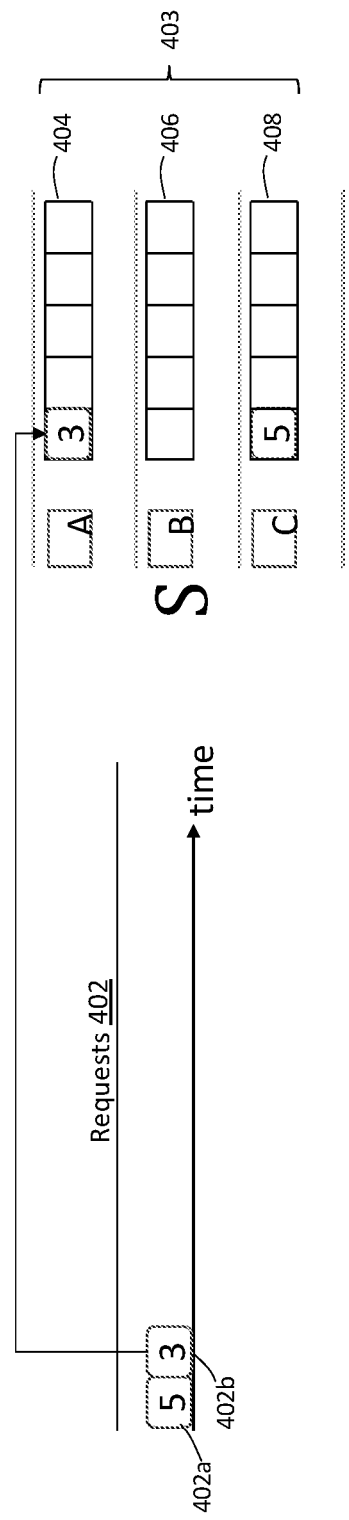
FIG. 4A
FIG. 4B

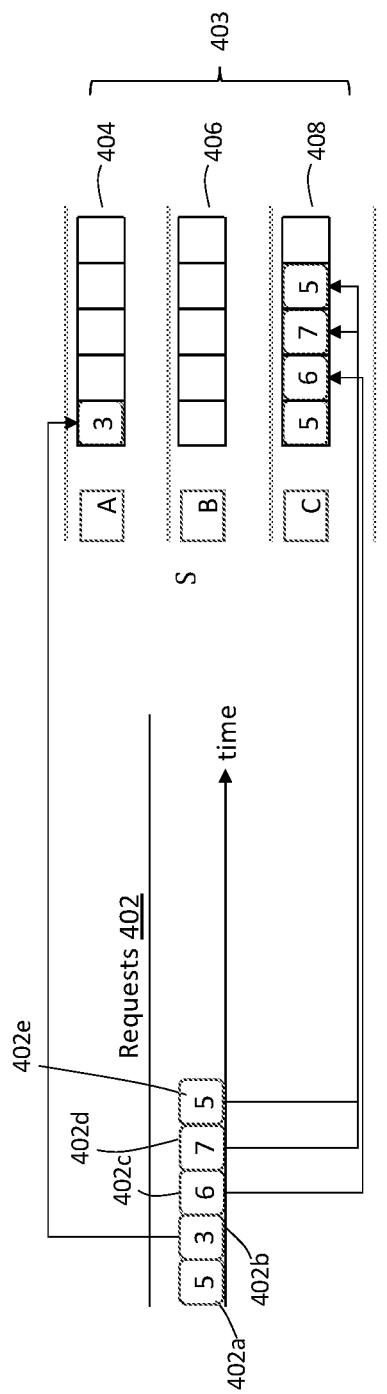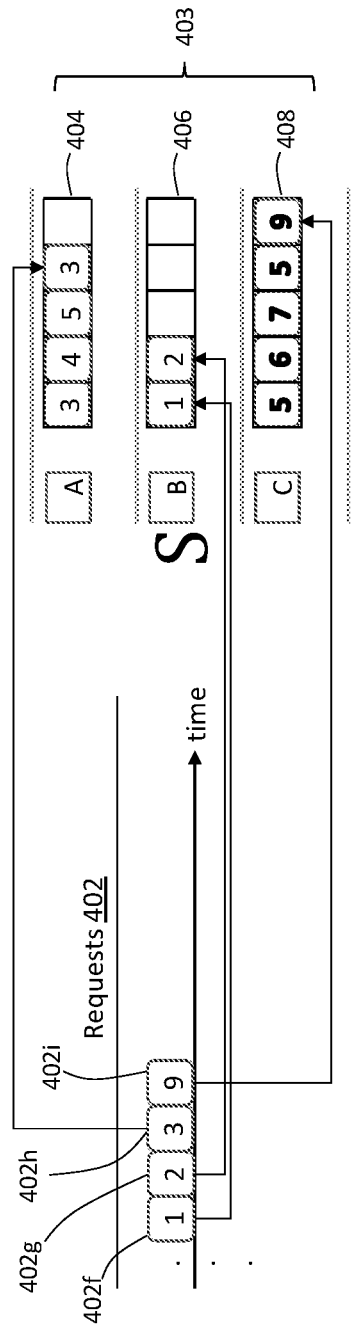

DETERMINING PRE-FETCHING PER STORAGE UNIT ON A STORAGE SYSTEM

BACKGROUND

Technical Field

This application generally relates to data storage systems, and more particularly to pre-fetching data on a storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

Storage systems may include a global memory (GM) shared by components of the storage system. The GM may include a cache to temporarily store data previously read from or written to (or is in the process of being read from or written to) physical storage devices of the storage system. Components of the storage system typically can access data in cache faster (typically much faster) than data stored on a physical storage device. In a typical storage system, data written to the storage system from a host is first stored in the cache, and then de-staged to the one or more target physical storage devices after some time. Further, data may be prefetched for read operations and stored in cache. After some period of time, a portion of data stored in cache is evicted, for example, in accordance with an eviction policy such as, for example, a least recently used (LRU) policy.

Pre-fetching is a well-known technique to optimize cache behavior. It exploits data locality with the assumption that applications often request data residing in sequential addresses in a given address space. Namely, when a device's operating system receives a data access request at a certain address, Ai, it retrieves not only the content of that location, but also the content of the N next address locations, {Ai+1, ..., Ai+N}, before the application actually requests the data from those other addresses. The operating system then places the retrieved content in a cache, which, by design, is a much faster media than the one where the data originally resides (e.g., on a physical storage device). If the application indeed requests data from subsequent addresses, the operating system satisfies those requests directly from the cache, instead of fetching data from the slower media for each request. The parameter N defines the number of sequential addresses that the operating system pre-fetches to the cache at each request, and it is commonly referred to as the look-ahead window, and sometime referred to herein as the look-ahead value of LAV. Using a value of N too small might lead to a drop in performance in cache hits, i.e., the number of requests that are already in cache, whereas a large N, besides other issues discussed herein, will increase the burden on the CPU because of the activity of bringing data to cache.

Despite the fact that pre-fetching tends to yield very good results in general, it may incur the so-called cache pollution problem. Cache pollution refers to pages that are pre-fetched but are not used—that is, they don't result in any hits during their lifetime in the cache. Cache pollution is a problem since these unnecessary pages lead to faster eviction of other pages in the cache. Pages that are evicted sooner may result in less hits, reducing the overall cache performance in the system.

A typical approach for the implementation of pre-fetching in cache policies is to set a fixed look-ahead window for all logical storage units (e.g., LUNs) in the system. Although this static strategy underperforms in many cases when compared to dynamic look-ahead strategies, it has the advantage of requiring no additional computation during execution. It highlights, however, the problem of cache pollution, as the static value will typically incur many unnecessary pages being brought to the cache in order to ensure a higher hit ratio. Conversely, reducing the look-ahead to minimize pollution will lose hits in the tradeoff. In the extreme case, with a static look-ahead of zero pages, the strategy reverts (corresponds exactly) to the LRU policy with no pre-fetching.

In order to deal with this problem in a dynamic way, some storage systems implement policies that assign a fixed look-ahead value but decide, for each request, whether a pre-fetch will be performed. Such storage systems enable pre-fetching only for requests that are considered part of sequential access; i.e., access of consecutive contiguous sections of a LUN.

SUMMARY OF THE INVENTION

In some embodiments, for a data storage system including a cache and one or more physical storage devices, where data for a plurality of logical storage units is stored on the one or more physical storage devices, a method is performed. The method includes receiving a first read request to read a first page of a first of the plurality of logical storage units, and, for a first group of one or more most recent read requests for the first logical storage unit, the first group including the first read request and one or more most recent read requests for the logical storage unit prior to the first read request, each of the one or more most recent read requests specifying a respective second page of the first logical storage unit, determining a value of a proximity metric indicative of a collective sequential proximity of the first page and the one or more second pages within the first logical storage unit. The method further includes determining whether to pre-fetch one or more next sequential pages to the first page of the first logical storage unit based on the value of the proximity metric, fetching the first page from the one or more physical storage device into the cache, and prefetching the one or more next sequential pages from the one or more physical storage devices into the cache only if it is determined to prefetch the one or more next sequential pages.

Determining whether to pre-fetch the one or more next sequential pages of the first logical storage unit may include comparing the proximity metric to a predefined proximity threshold and determining to pre-fetch the one or more next sequential pages if the proximity metric is greater than or equal to the predefined proximity threshold.

A predefined look-ahead value may define a number of next pages to pre-fetch for the first logical storage unit for a pre-fetch operation. Determining the proximity metric may include sorting the first group into a first sequence according to a sequential order of the first page and the one or more second pages with the first logical storage unit, and, for each pair of successive read requests in the first sequence, determining a page difference, if any, between the respective pages of the pair, and, if there is a page difference between the respective pages, adding one to a page difference count, determining whether an amount of the page difference is the same or less than the look-ahead value, and if the amount of the page difference is the same or less than the look-ahead value, adding one to a pre-fetch hit count. Determining the proximity metric value may further include calculating the proximity metric value as the pre-fetch hit count divided by the page difference count.

A predefined look-ahead value may define a number of next pages to pre-fetch for the first logical storage unit for a pre-fetch operation, the proximity metric may be based at least in part on the look-ahead value, and the method may further include modifying a probability of performing a pre-fetch operation by changing the look-ahead value.

The method may further include maintaining a data structure including one or more entries, each entry corresponding to a respective one of the plurality of logical storage units, and each entry specifying a group of most recent read requests for the respective logical storage unit corresponding to the entry, where determining the proximity metric may include accessing the data structure.

Each entry of the data structure may include one or more page fields specifying a respective value for a page of one of the one or more most recent read requests of the logical storage unit represented by the entry, up to a predefined maximum number of page field values. The method may further include, in response to receiving the first read request, determining that a first entry of the one or more entries of the data structure already includes the predefined maximum number of page field values, removing one or more oldest page field values from the first entry, and adding a page field value representing the first page.

The determination of whether to pre-fetch the one or more next sequential pages may not include determining whether any data of the first logical storage unit is currently stored in the cache.

In some embodiments, a data storage system includes a cache, a plurality of logical storage units, one or more physical storage devices on which data for the logical storage units is stored, one or more processors; and a memory including code stored thereon that, when executed, performs the above-described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 3A is a block diagram illustrating an example of a data structure for storing pre-fetch parameter values, according to embodiments of the invention;

FIG. 3B is a block diagram illustrating an example of a data structure for recording most recently requested pages for logical storage units, according to embodiments of the invention;

FIGS. 4A-4F illustrates an example of populating a data structure for recording most recently requested pages for logical storage units in response to receiving read requests, according to embodiments of the invention.

FIG. 6 illustrates a sorting of the most recent page requests for a logical storage unit, according to embodiments of the invention;

DETAILED DESCRIPTION OF EMBODIMENT(S)

Figure 1:
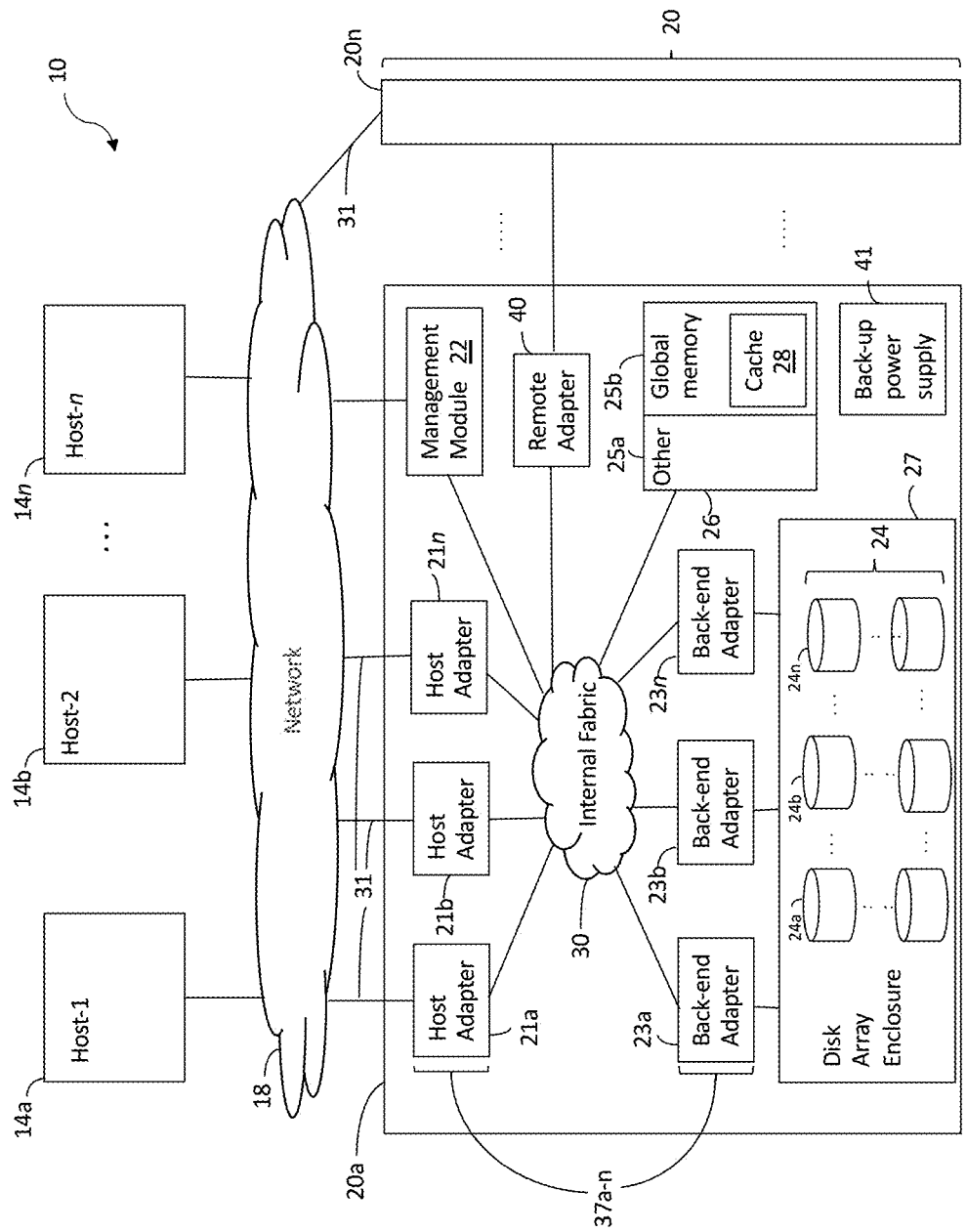
FIG. 1 is a block diagram illustrating an example of a data storage network, according to embodiments of the invention.

System administrators may subdivide the available storage resources of a storage system into many logical storage units. As used herein, a logical storage unit (or "LSU") may be any of a logical volume, logical block, LUN (i.e., logical device or logical disk), thin device, groups of logical devices (e.g., storage group), NVMe namespace, or other type of LSU used for storage systems. For example, a PowerMax™ storage system made available from EMC Corp. of Hopkinton, Mass. (Dell EMC) may be configured to divide available storage resources into many LUNs, each with its own addressable space defined in logical blocks addresses (LBAs). Enterprise-grade applications may be configured in such way to leverage the most out of the underlying storage configuration, and sometimes even determine how the storage should be configured. Consequently, LSU configurations might even be different for the same application running at different places. For instance, a database administrator (DBA) working at "Bank A" might configure the LSUs for the bank's database management system (DBMS) different from how a DBA at "Bank B" would configure them for that bank's DBMS.

Data access patterns also vary with time and reflect aspects of the seasonality of the operations associated with them. Therefore, factors such as how a storage system is divided into LSUs and how these LSUs are accessed over time may affect cache policies, which should ideally be adaptive and optimized to account for those conditions. These issues are faced by approaches based on sequentiality detection that depend on the state of the cache. While these approaches have the positive aspect of intrinsically taking frequency of requests and lifetime in cache into account, they don't really capture workload characteristics of the LSUs.

Furthermore, it is often desirable that cache management policies have relatively small computation costs (small CPU and memory usage) to avoid performance hindrances in storage systems. Hundreds or even thousands of requests might occur within a second, which makes heavy computations undesirable at best, infeasible at worst.

What is desired is an improved pre-fetching technique that better optimizes a balance between performance and cache pollution, and that takes into account workload characteristics of individual LSUs.

A read request received from a host may specify an LSU, a starting logical block address (e.g., LBA) within the LSU and a length of the data to be read, which may be mapped to one or more pages of the logical storage device (alternatively, the read request itself may specify pages or a starting page instead of an LBA). As used herein, a "page" is a unit of data of an LSU, e.g., a smallest unit of data of an LSU. Each page represents a logical address range of the LSU, each page having a same predefined length. For example, an LSU may be divided into a plurality of pages (i.e., logical address ranges) of 128 kB, 512 kB, 2 MB, 4 MB The pages may be designated by page numbers that reflect a position of the page within an ordered sequence of pages of the LSU. Consider the following primitive example for purely illustrative purposes. A LUN having a capacity of 64 KB, i.e., a cumulative address range of 0-128 KB, and page size of 8 KB, may have pages 1-8 as illustrated in Table 1.

TABLE 1

Example of Page Address Ranges of a Logical Storage Unit

| Page No. | Address Range |
|---|---|
| 0 | 0-8 KB-1 |
| 1 | 8 KB-16 KB-1 |
| 2 | 16 KB-24 KB-1 |
| 3 | 24 KB-32 KB-1 |
| 4 | 32 KB-40 KB-1 |
| 5 | 40 KB-48 KB-1 |
| 6 | 48 KB-56 KB-1 |
| 7 | 56 KB-64 KB-1 |

Consecutive page numbers may be considered to represent sequential pages. For example, pages 1 and 2 are sequential, and pages 4-6 are sequential. The closer the page numbers of two pages (e.g., the less the difference between the page numbers of the pages), the more sequentially proximate the two pages may be considered. For example, pages 6 and 8 may be considered more sequentially proximate than pages 1 and 4 because 8-6=2 is less than 4−1=3. Conversely, pages 1 and 4 are considered more sequentially distant from each other than pages 6 and 8.

Described herein are pre-fetching techniques that determine what data, if any, to pre-fetch on a per-LSU basis, where, for a given LSU, what, if any, data to prefetch is based at least in part on a collective sequential proximity of the most recently requested pages of the LSU (e.g., the pages specified in, or corresponding to, the most recent read requests for the LSU).

Determining what, if any, data to pre-fetch for an LSU may include determining a value for a proximity metric indicative of the collective sequential proximity of the most recently requested pages, comparing the value to a predetermined proximity threshold value (PTV), and determining whether to pre-fetch one or more pages of the LSU based on the result of the comparison.

In some embodiments, a data structure may be maintained that includes the most recently requested pages (also referred to herein as the most recent pages requested) for one or more LSUs. This data structure may be a table, and may be referred to herein as a most recent pages (MRP) table. The MRP table may include a plurality of entries (i.e., rows), each entry corresponding to a respective LSU. Each entry may include a predefined number of the fields, one or more of the fields holding a value (e.g., a page number) indicative of one of the most recently requested pages of the LSU. The MRP table may be a hash-like structure indexed by LSU ID, such that each entry may be accessed using an ID of the LSU corresponding to the entry.

Determining a proximity metric value for an LSU may include accessing the entry of the MRP table corresponding to the LSU, for example, in response to receiving a read request for the LSU. The entry may be updated, including, for example, adding a page number representing a page (e.g., a first page) of the received read request to a field of the entry. In some embodiments, the entry may be full (i.e., at capacity) in that all of the predefined number of fields have values specifying a page number, in which case the page value in one or more fields must be discarded before adding a page number for the current read request, as is described in more detail herein. The number of page values that are discarded from an MRP entry in response to a read request when the MRP entry is full may be defined by a parameter referred to herein as an discard number value (DNV).

Determining the proximity metric may include, after updating the corresponding entry of the MRP table, sorting the one or more fields of the entry according to a sequential order of the pages within the LSU, to produce a sorted MRP sequence of pages. It then may be determined, for each pair of consecutive pages in the sorted MRP sequence whether the page numbers of the pages are different. If the page numbers are different, than a difference count may be incremented by 1, and it may be determined if the difference between the pages is less than or equal a pre-defined look-ahead threshold value (LATV), which may be specified for the LSU or the system as a whole. Is some embodiments, the LATV may be the same value as a look-ahead value (LAV), i.e., a value indicative of a number of next pages to pre-fetch for the LSU for a pre-fetch operation. In other embodiments, the LATV may be a different value. If the page difference (e.g., 2) is less than or equal to the LATV (e.g., 3), a pre-fetch hit count may be incremented by 1. If the LATV=LAV or is very nearly the same value, the resulting value of the pre-fetch hit count may represent, roughly, the number of read cache hits that would have resulted for the most recently read pages of the MRP entry if a pre-fetch operation using the LAV were performed for all of the corresponding read requests.

The proximity metric value may be the result of dividing the pre-fetch hit count by the difference count; i.e., the proportion or ratio of the pre-fetch hit count to the difference count. The number of page fields to include in an MRP entry; i.e., the maximum number of most recent pages requested to consider when determining the proximity metric value, may be specified by an MRP size parameter value.

In some embodiments, each of one or more pre-fetch parameters, including, for example, MRP size, LATV, DNV and PTV may be maintained and modified to adjust pre-fetching behavior, as is described in more detail herein.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications between one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be a Fibre Channel (FC) adapter if FC is the technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems, such as between two of the same or different types of storage systems, and/or may be implemented using a director.

Storage system 20a also may include a management module 22, which may be configured (e.g., dedicated) to performing storage management functions or services such, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, a sending one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to allow after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
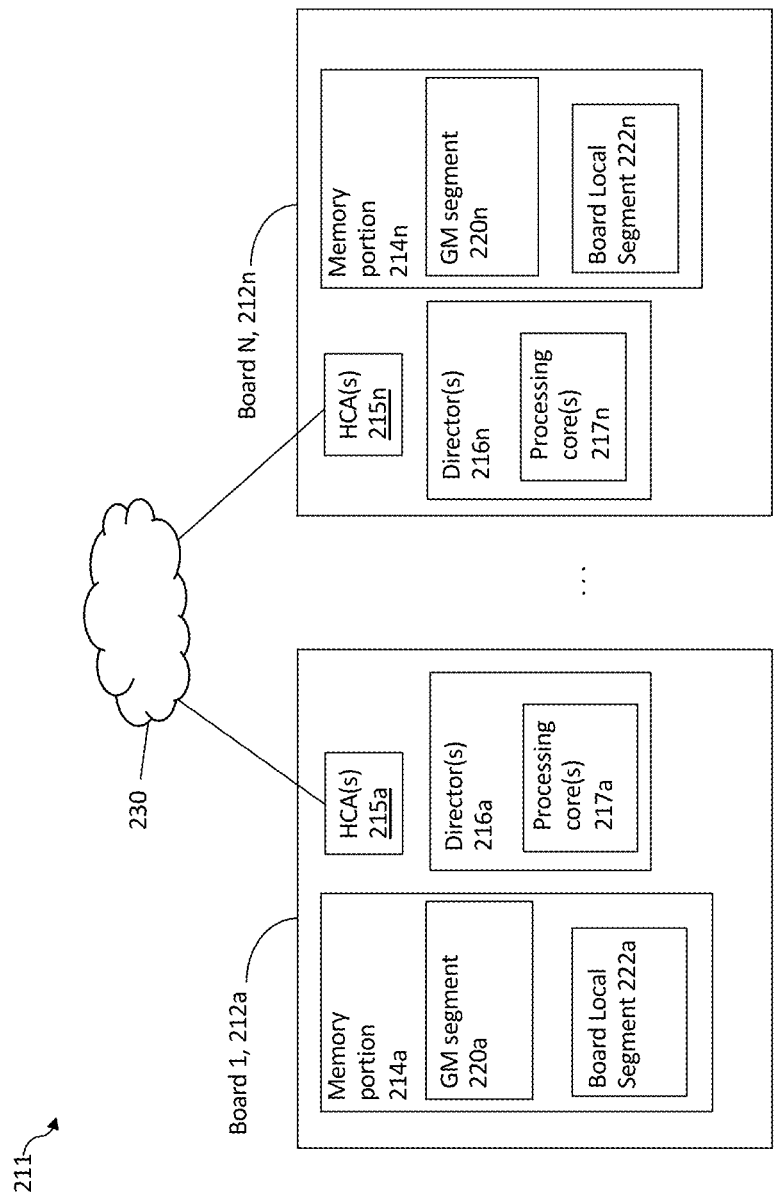
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and access control information to storage systems 20a-n over a plurality of I/O paths defined between the host systems and storage systems, for example, including host system components, storage system components, and networks components (e.g., of network 18), and the storage systems also may provide data to the host systems across the I/O paths. In the embodiment of FIG. 1, the host systems do not address the physical storage devices (e.g., disk drives or flash drives) 24 of the storage systems directly, but rather access to data may be provided to one or more host systems from what the host systems view as a plurality of LSUs including, for example, a logical volume, logical block, LUN (i.e., logical device or logical disk), thin device, groups of logical devices (e.g., storage group), NVMe namespace, and other types of LSUs.

The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

In an embodiment in accordance with techniques herein, the storage system as described may be characterized as having one or more logical mapping layers in which an LSU of the storage system is exposed to the host whereby the LSU is mapped by such mapping layers of the storage system to one or more physical devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store MD (e.g., any of the MD described herein) associated with such data. Illustrative examples of data structures for holding such MD will now be described.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, MD, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various MD and/or structures, and other information, as described in more detail elsewhere herein. Consistent with discussion herein, the data cache, having cache slots allocated from GM segments 220a-n, may be used to store I/O data (e.g., for servicing read and write operations).

Data may be pre-fetched (e.g., according to cache policy) into a data cache (e.g., cache 28, which may be formed from GM segments 220a-n). In some embodiments, it may be determined what data, if any, to pre-fetch on a per-LSU basis. For example, for a given LSU, it may be determined what, if any, data to prefetch based at least in part on a collective sequential proximity of the most recently requested pages of the LSU (e.g., the pages specified in, or corresponding to, the most recent read requests for the LSU).

In some embodiments of the invention, one or more parameter values may be provided for pre-fetching per LSU according to embodiments described herein. For example, FIG. 3A is a block diagram illustrating an example of a data structure 300 for storing pre-fetch parameter values, according to embodiments of the invention. Other embodiments of a data structure for storing pre-fetch parameter values, for example, variations of data structure 300, are possible and intended to fall within the scope of the invention. Data structure 300 may be referred to herein as the pre-fetch parameter data structure (PPDS) and the pre-fetch parameter values stores therein as PP values.

The PP values may include any of: an MRP size value 302; an LATV 304, and DNV 306 and a PTV 308. The MRP size value 302 may specify the number of most recent pages requested for an LSU to consider when determining whether to perform a pre-fetch operation for the LSU in response to a read request for the LSU; i.e., how far to look back when making this determination. The MRP size value 302 may be used to determine the number of page entry fields for each MRP entry (e.g., entries 352, 354 and 356) of an MRP table (e.g., MRP table 350). The MRP size value 302 may be selected to relate to an expected lifetime of pages in the cache (i.e., before being evicted from cache), and may be adjusted to modify pre-fetch behavior, as described in more detail elsewhere herein.

The LATV 304 may be set equal to an LAV for the LSU or overall system, a value indicative of a number of next pages to pre-fetch for an LSU for a pre-fetch operation. LATV may be compared to a difference between page numbers of a consecutive pair of pages in a sorted MRP sequence to determine whether to increment the prefetch hit count, as described in more detail elsewhere herein. In some embodiments, the LATV 302 may be a different value than the LAV, but still compared to a difference between page numbers of a consecutive pair of pages in a sorted MRP sequence to determine whether to increment the prefetch hit count. The LATV 302 may be adjusted to modify pre-fetch behavior as described in more detail elsewhere herein.

The DNV 306 may specify the number of page values that are discarded from an MRP entry for an LSU in response to a read request for the LSU when the MRP entry is full. The DNV 306 may be defined, and adjusted to modify pre-fetch behavior, as described in more detail elsewhere herein.

The PTV may specify a proximity threshold value to be compared against a proximity metric value for an LSU in response to receiving a read request for the LSU to determine whether one or more pages are to be pre-fetched for the LSU in addition to fetching the one or more pages of the read request. The PTV 306 may be adjusted to modify pre-fetch behavior as described in more detail elsewhere herein.

FIG. 3B is a block diagram illustrating an example of an MRP table 350. Other embodiments of a data structure for recording most recent page requests for LSUs, for example, variations of MRP table 350, are possible and intended to fall within the scope of the invention.

The MRP table 350 may include a plurality of entries, including MRP entries 352, 354 and 356, each entry corresponding to a respective LSU. Each MRP entry may include a plurality of page fields in respective page columns 353, 355, 357, 359 and 361. The number of page columns and page fields per entry may be configured to the value of the MRP size parameter 302. For example, in the embodiment illustrated FIG. 5, the number of page columns and page fields of the MRP table 350, and MRP size parameter 302, may be equal to 5. Each MRP entry may be considered to hold the current MRP sequence for the LSU it represents; i.e., the most recent (i.e., last) pages requested for the LSU it represents. As used herein, the most recent pages requested for an LSU means the pages corresponding to (i.e., specified by or mapped from logical address specified by) the most recent (i.e., last) read requests of the LSU. The order of the pages specified with a current MRP sequence may be the order in which the pages were received, reflected in an MRP entry from left to right; i.e., in the order illustrated by page columns 353, 355, 357, 359 and 361. For example: the order of the MRP sequence stored in MRP entry 352 is 78, 4, 5, 7, 7; the order of the MRP sequence stored in MRP entry 354 is 79, 10, 17, 15; and the order of the MRP sequence stored in MRP entry 356 is 20, 81, 4, 6 and 30.

Each MRP entry 352, 354 and 356 may initially have no page values specified in the page fields for the page columns, which may be populated over time as read requests are received for the LSUs, for example, as illustrated in FIGS. 4A-4F, which will now be described.

FIGS. 4A-4F illustrate an example of populating a data structure for recording most recently requested pages for LSUs, MRP table 403, in response to receiving read requests, according to embodiments of the invention. In FIGS. 4A-4F, and elsewhere herein, the MRP size may be references by the variable w, and the DNV may be referenced by the variable z. Page requests 402 are illustrated as being received over time from left to right. Further, as used in reference to FIGS. 4A-4F and elsewhere herein, for an ordered sequence of page requests, r1, r2, . . . , rn in a storage system, each request ri may be represented as a tuple (LSUid, p), where LSUid is a unique identifier of an LSU (e.g., logical device or thin device) and p is a page within that LSU.

The MRP table 403 in FIGS. 4A-4F includes a plurality of MRP entries 404, 406 and 408 for LSUs A, B and C respectively, each holding the current MRP sequence of its respective LSU, i.e., a list of the last w requested pages for the respective LSU. For example, MRP entries 404, 406 and 408 may be the MRP entries 352, 354 and 356 at another point in time. The size w of the MRP entries may be configured relative to the expected lifetime of pages in the cache (e.g., the cache 28) of the storage system, as described in more detail elsewhere herein. In the example of FIGS. 4A-4F, w=5.

FIG. 4A illustrates an example of the MRP entry 408 of LSU C being populated in response to first page request 402a, $r_0$=(C, 5) for LSU C.

FIG. 4B illustrates an example the MRP entry 404 of LSU A being populated in response to a first page request 402b LSU.

FIG. 4C represents a later point in time, after which page requests 402c-e have been received for LSU C, resulting in further population of the MRP entry 408 as shown. As illustrated, the page fields of the MRP entry 408 are populated with the page numbers of the page requests received from left to right in the order in which the page requests are received, as described above in relation to the MRP table 350. It may be desirable to order the page field values in this manner for dealing with MRP entry overflow, i.e., when a page request is received for an LSU that whose MRP entry in the MRP table is full.

When the MRP entry of an LSU is full (i.e., it holds exactly w page numbers) and another request ri(LSUid, x) is made (for a variable page x), the following may be performed:

1. Clear the first z elements of the MRP entry of the LSU; and
2. Store page number of page x in the MRP entry of the LSU.

As described in more detail elsewhere herein, z (i.e., the DNV) may be defined relative to the size, w, of an MRP entry, with a value: $1 \leq z \leq w$. The DNV, z, specifies the number of page field values (i.e., page numbers) discarded (and thus dictates how many page numbers are kept) when an MRP entry is full. In some embodiments, the page numbers of the oldest z request(s) are discarded, which is why it may be desirable to order the page field values as described.

FIG. 4D represents a later point in time, after which page requests 402f-j have been received for LSUs B, A and C, resulting in further population of MRP entry 406, 404 and 408 as shown. Also, additional page requests were previously received for LSU A before page requests 402f-j, and MRP entry 404 populated accordingly. MRP entry 408 for LSU C is now full.

Figures 4E, 4F:
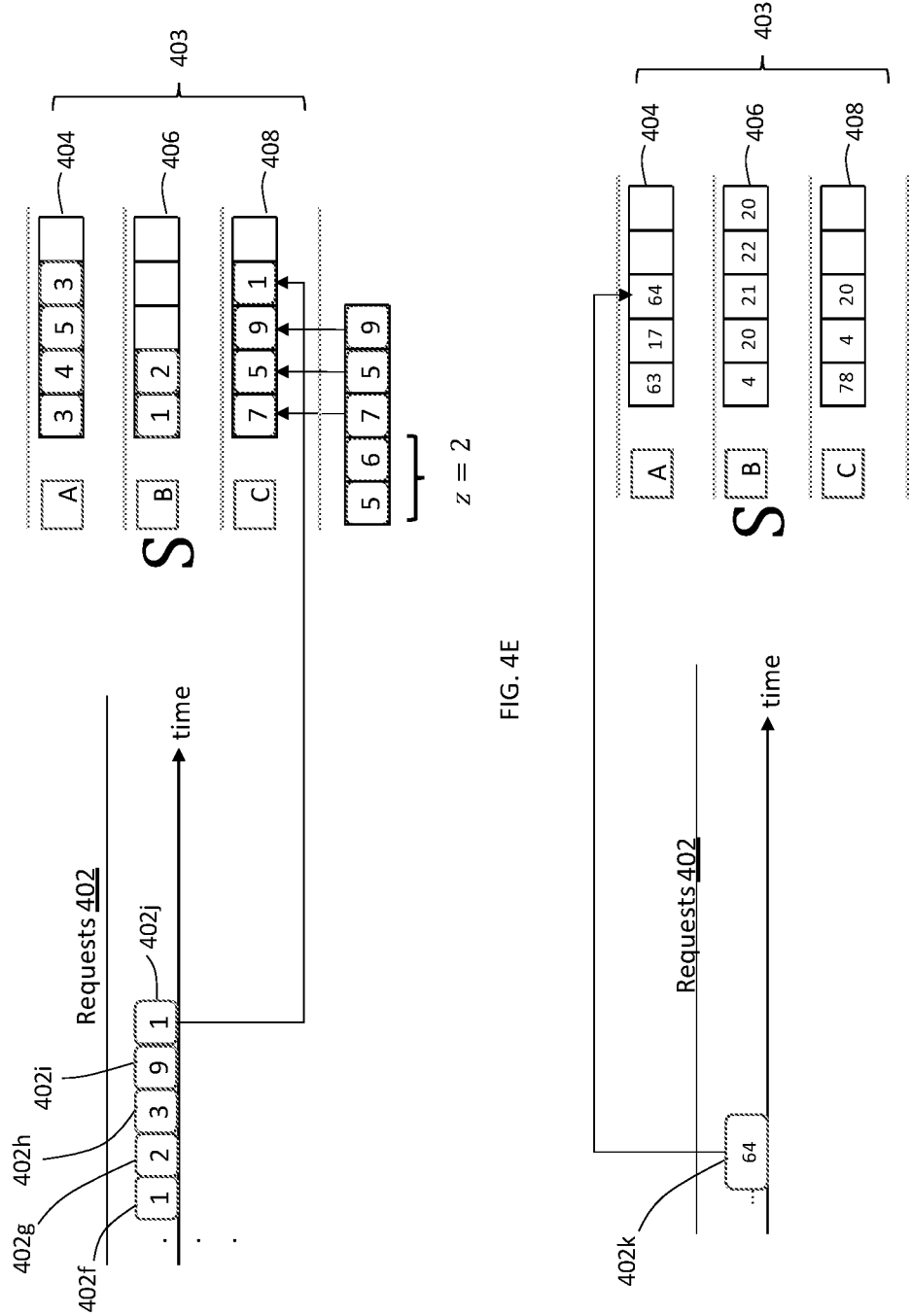

FIG. 4E illustrates an example of the resulting state of the MRP table 403 after receiving a request for an LSU with a full MRP entry. In this example, z=2. As illustrated, the two oldest page numbers 5 and 6 of MRP entry 408 of LSU C are discarded.

FIG. 4F represents a much later point in time, after which several other page requests have been received for each of LSUs A, B and C, a latest being page request 402k, with which MRP entry 404 is populated. The state of MRP table 403 in FIG. 4F may be representative of a typical state of an MRP table after sufficient time has passed such that each MRP entry, e.g., entries 404, 406 an 408 have at least z +1 page numbers specified.

In some embodiments, the value of z (i.e., DNV) is defined to be approximately 50% of the size of an MRP entry, w (i.e., MRP size), which experiments have shown yield desirable results. Consider the edge case where z=w. This would mean clearing an entire MRP entry in response to an MRP entry overflow, which has been found to represent too abrupt changes in sequential proximity recognition for an LSU, and results becoming too sensitive to small changes in the order of requests.

Conversely, consider the other edge case, where z=1. This would mean modifying the MRP entry of an LSU in a sliding window fashion for every page request received (after MRP capacity is reached for a first time). It is more computationally efficient when $1 < z < z$), in which case pages for new request are added to an MRP entry up to w and then z>1 elements are cleared all at once, than when Z=1, in which case one page number is deleted and one added for every single page request.

Figure 5:
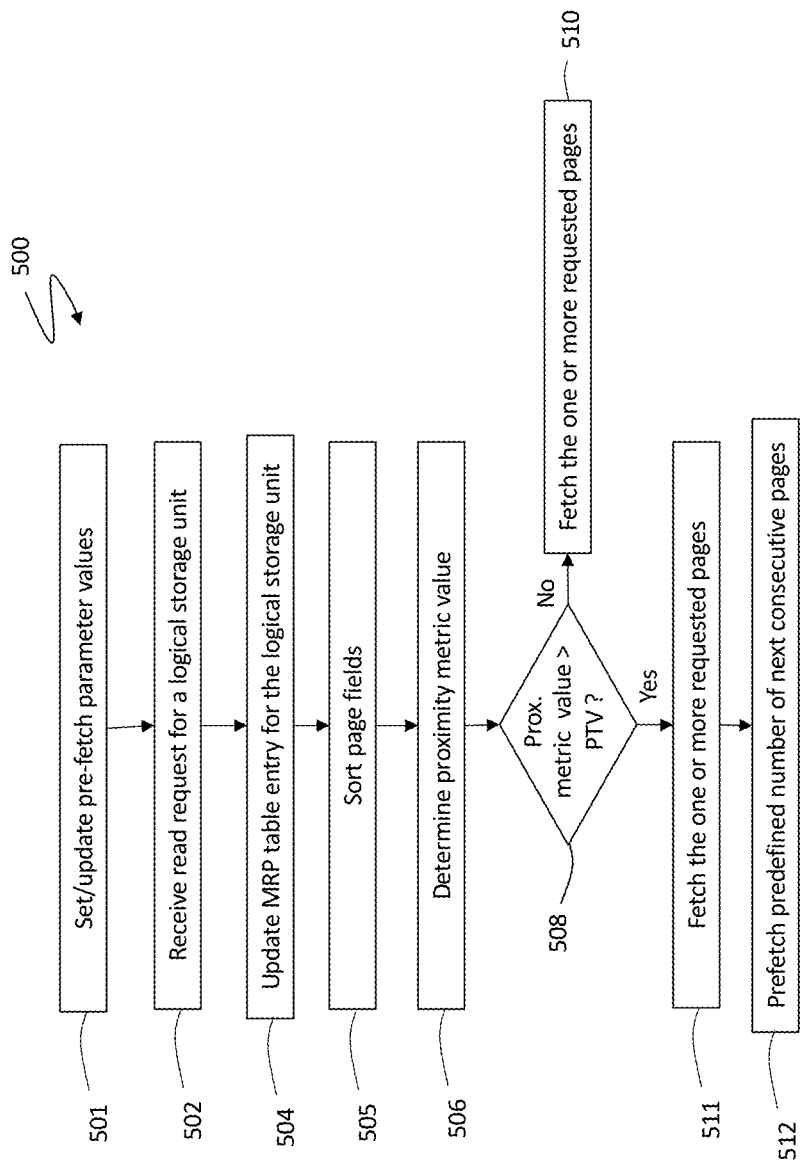
FIG. 5 is a flowchart illustrating a method of determining whether to pre-fetch data for a logical storage unit based on a collective sequential proximity of most recent read requests for the logical storage unit, according to embodiments of the invention.

FIG. 5 is a flowchart illustrating a method 500 of determining whether to pre-fetch data for an LSU based on a collective sequential proximity of most recent read requests for the LSU, according to embodiments of the invention. Other embodiments of a method of determining whether to pre-fetch data for an LSU, for example, variations of method 500, are possible and intended to fall within the scope of the invention.

In a step 501, one or more pre-fetch parameter values may be set or updated, for example, any of the PP values described herein, including MRP size, LATV, DNV and PTV, any of which may be stored in the PPDS 300.

In a step 502, a read request may be received for an LSU, for example, from a host. The read request may specify one or more pages of the LSU or one or more logical addresses (e.g., LBAs) and/or data lengths that map to one or more pages of the LSU.

In a step 504, the MRP table entry for the LSU may be updated, for example, as described in relation to FIGS. 4A-4F. The step 504 may include adding a page value for a page of the read request to a field of the MRP table entry. In some embodiments, if the MRP table entry is full, one or more page field values may be discarded, the number of which may be specified by a DNV (e.g., the DNV 306).

In a step 505, the page fields of the MRP table entry may be sorted into a sorted MRP sequence. The sorted MRP sequence may order the pages of the MRP table entry according to their sequence in the LSU, for example, as illustrated in relation to FIG. 6, which will now be briefly described.

FIG. 6 illustrates a sorting of an MRP entry 602 into a sorted MRP sequence 604. As illustrated in FIG. 6, the original sequence represented by the MRP entry 602 includes page numbers {78, 4, 5, 7, 7}. The order from left to right in the entry 602 may be the order in which the read requests corresponding to the pages represented by page numbers 78, 4, 5, 7, 7 were received at the storage system. Sorting the MRP sequence according to page number, e.g., according to the sequential order of the pages in the LSU results in sorted MRP sequence 604: {4, 5, 7, 7, 78}.

Figure 7:
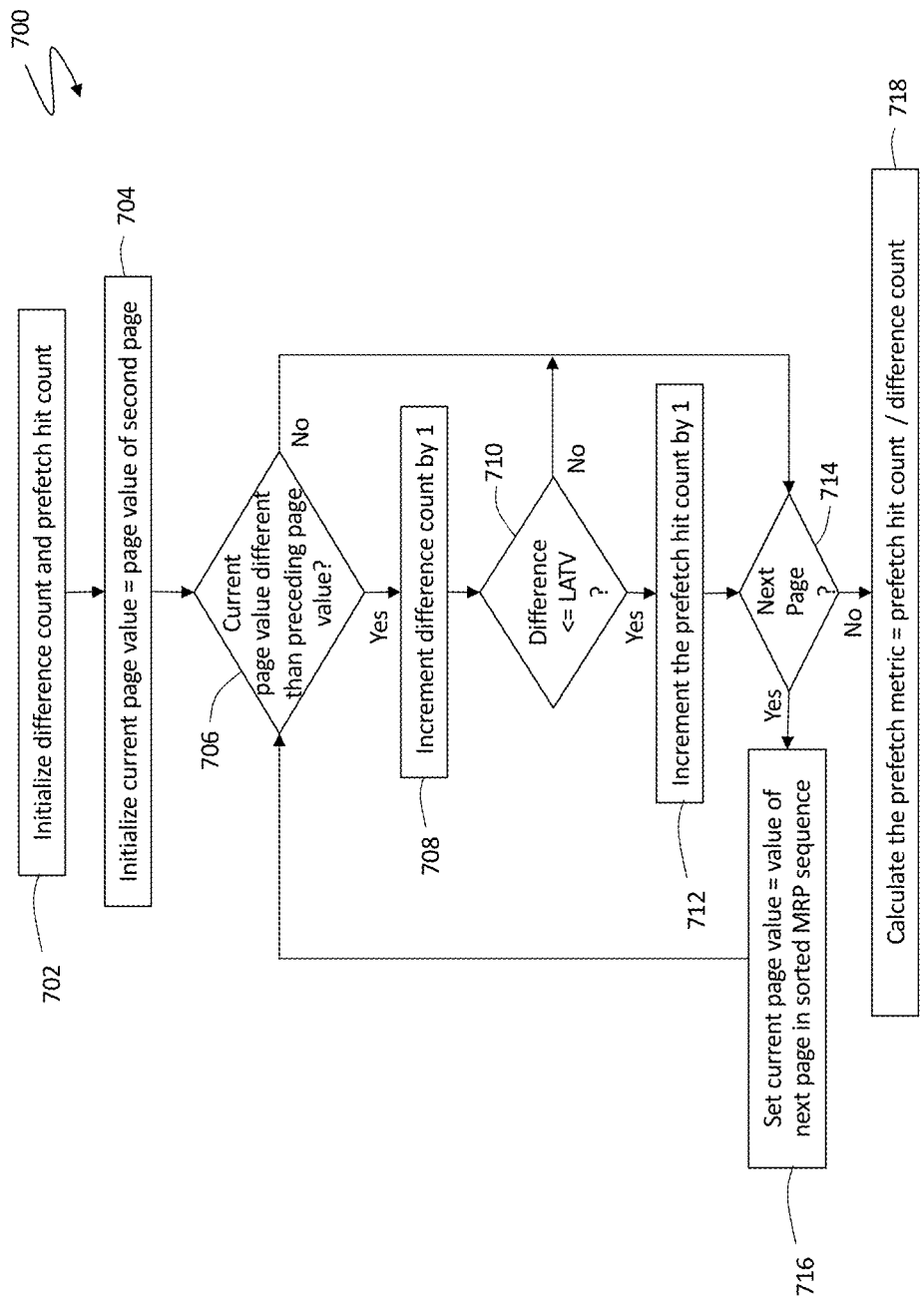
FIG. 7 is a flowchart illustrating a method of determining a proximity metric value for the most recent page requests of a logical storage unit, according to embodiments of the invention.

Returning to FIG. 5, in a step 506, a proximity metric value indicative of a collective sequential proximity of the pages of the MRP entry (now sorted as a sorted MRP sequence) may be determined, for example, as described in relation to method 700 in connection with FIG. 7.

In a step 508, it may be determined whether the determined proximity metric value is greater than a PTV, for example, the PTV 308. If it determined that the proximity metric value is greater than the PTV, one or more requested pages corresponding to the read request may be fetched into cache in a step 511 and a predefined number (e.g., =LAV) of one or more next consecutive pages of the LSU are pre-fetched into cache in a step 512.

If it determined in the step 508 that the proximity metric value is not greater than the PTV, then the one or more requested pages corresponding to the read request may be fetched into cache in a step 510, but no pages are pre-fetched.

In some embodiments, the method 500 may be considered to determine whether an LSU is currently in the midst of a sequential pattern of workload, for example, by determining a proportion (i.e., percentage) of most recently requested pages that are within the reach of the LAV (e.g., when LATV=LAV) for the LSU.

FIG. 7 is a flowchart illustrating a method 700 of determining a proximity metric value for the most recent page requests of an LSU, according to embodiments of the invention, for example, as part of the performance of the step 506 of the method 500. Other embodiments of a method of a proximity metric value for the most recent page requests of an LSU for example, variations of method 700, are possible and intended to fall within the scope of the invention.

In a step 702, a difference count value and prefetch hit count value may be initialized, e.g., set to 0, and, in a step 704, a current page value may be initialized to a value of the second page of the sorted MRP sequence. That is, on a first pass through a loop defined by steps 706, 708, 710, 712, 714 and 716, the current page value is set equal to the page value of the second page.

In a step 706, it may be determined whether the current page value is different than a value of the page immediately preceding the current page in the sorted MRP sequence. For example, on a first pass through the loop, the step 706 may determine whether the second page value is different than the first page value of the sorted MRP entry.

If it is determined in the step 706 that the current page value is different than a value of the page immediately preceding the current page in the sorted MRP sequence, than the difference count may be incremented by 1 in a step 708; and, in a step 710, it may be determined whether the difference between the current page value and the previous page value is less than or equal to an LATV (e.g., the LATV 304).

If it is determined that the difference between the current page value and the previous page value is less than or equal to an LATV, the pre-fetch count may be incremented by 1, and in a step 714, it may be determined whether there is a next page in the sorted MRP sequence. The step 714 also may be reached if it is determined in the step 706 that the current page value is not different than a value of the page immediately preceding the current page in the sorted MRP sequence; i.e., that the page values are the same. The step 714 also may be reached if it is determined in the step 710 that the difference between the current page value and the previous page value is greater than the LATV.

If it is determined in the step 714 that there is a next page in the sorted MRU sequence, then the current page value may be set to the value of the next page in the sequence, and the method 700 may return to the step 706, and the loop repeated.

If it is determined in the step 714 that there is not a next page in the sorted MRU sequence, the loop may be completed, and in a step 718 the prefetch metric may be calculated as the prefetch hit count divided by the difference count.

It should be appreciated that, in the embodiment of the method 700, zero-differences between consecutive page numbers of a sorted MRP sequence (i.e., when the page numbers are the same) are disregarded. That is, repeated page numbers in the sorted MRP sequence are not included in determining the difference count or the pre-fetch hit count. This may be desirable to do because repeated page requests do not result in cache hits due to prefetching. However, repeated page requests may indicate that such read accesses are locally clustered. By not counting such page requests for the prefetch count in addition to the difference count, penalizing the proximity metric value for an MRP sequence can be avoided.

The embodiment of method 700 may result in a high proximity metric value for an MRP sequence, which is indicative of a high collective sequential proximity of the MRP sequence, when such sequences include a relative few values repeated many times each. For example, an MRP sequence={8, 8, 8, 8, 9, 9, 9, 9} would return a proximity metric value of 1.0 for any value of LATV>1) even though this kind of access pattern doesn't benefit from pre-fetching.

However, in practice such cases should be rare enough that they won't affect the overall performance of the method 700. Further, the method 700 may be modified in a relatively straightforward manner to identify MRP sequences with too many repeated values and penalize the resulting proximity metric value, if desired.

Figure 8:
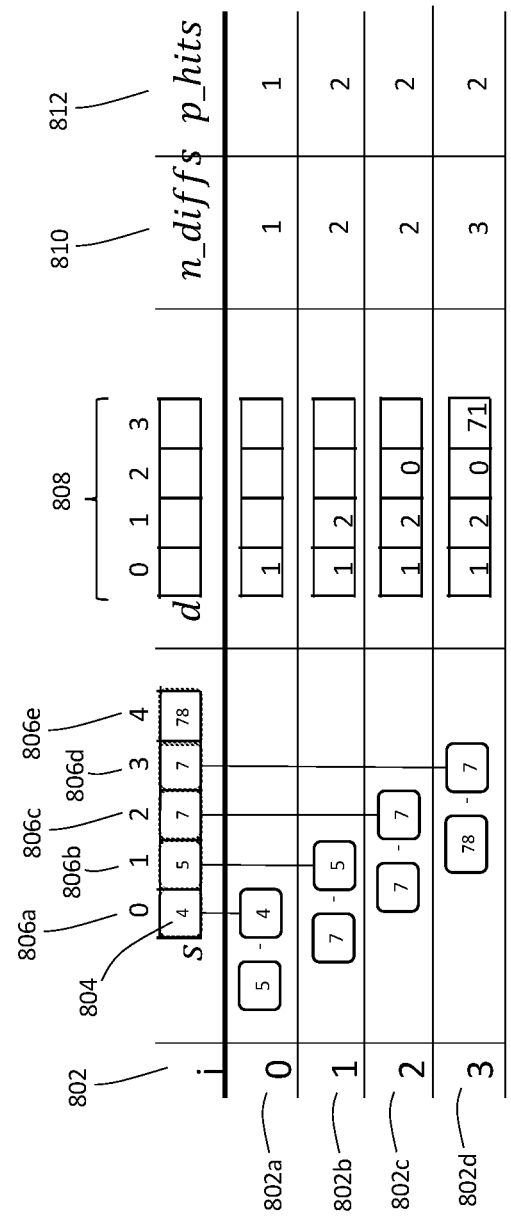
FIG. 8 illustrates an example of calculating a proximity metric, according to embodiments of the invention.

FIG. 8 illustrates an example of calculating difference counts 810 and pre-fetch hit counts 810 for a sorted MRP sequence 804 (e.g., the sorted MRP sequence 604) by applying the method 700, according to embodiments of the invention. In the embodiment of FIG. 8, the MRP size=5 and LATV=2. The sorted MRP sequence 804 includes elements 806a-f, holding values 4, 5, 7, 7 and 78, respectively.

FIG. 8 illustrates a plurality of iterations 802 denoted by iteration variable i, including iterations 0, 1, 2 and 3, of the loop defined by steps 706, 708, 710, 712, 714 and 716 of the method 700. Rows 802a, b, c and d represents results after iterations 0, 1, 2 and 3, respectively. A section 810 shows the calculated difference between successive page number values of the MRP sequence 804 for each of iteration 0, 1, 2 and 3. A column 810 shows the running difference count (n—diffs) after each iteration, and a column 812 shows the running pre-fetch count after each generation.

The information in the row 802a indicates that, after performance of the first iteration (0) for the pair of elements 806a and 806b:
 the calculated difference=5−4=1,
 the difference count=1, and
 the pre-fetch count=1.

The information in the row 802b indicates that, after performance of the second iteration (1) for the pair of elements 806b and 806c:
 the calculated difference=7−5=2,
 the difference count=2, and
 the pre-fetch count=2;

The information in the row 802c indicates that, after performance of the third iteration (2) for the pair of elements 806c and 806d:
 the calculated difference=7−7=0,
 the difference count=2, and
 the pre-fetch count=2
 (i.e., the difference count and pre-fetch count did not change because there was no difference);

The information in the row 802d indicates that, after performance of the fourth and final iteration (3) for the pair of elements 806d and 806e:
 the calculated difference=78−7=71,
 the difference count=3, and
 the pre-fetch count=2
 (i.e., pre-fetch count did not change because 71>LATV (=2);

For the example illustrated in FIG. 8, the prefetch metric value may be determined as (pre-fetch hit count/difference count)=2/3=0.6667. Whether or not to perform a pre-fetch will depend on whether 0.6667 is greater than the PTV.

Figure 9A:
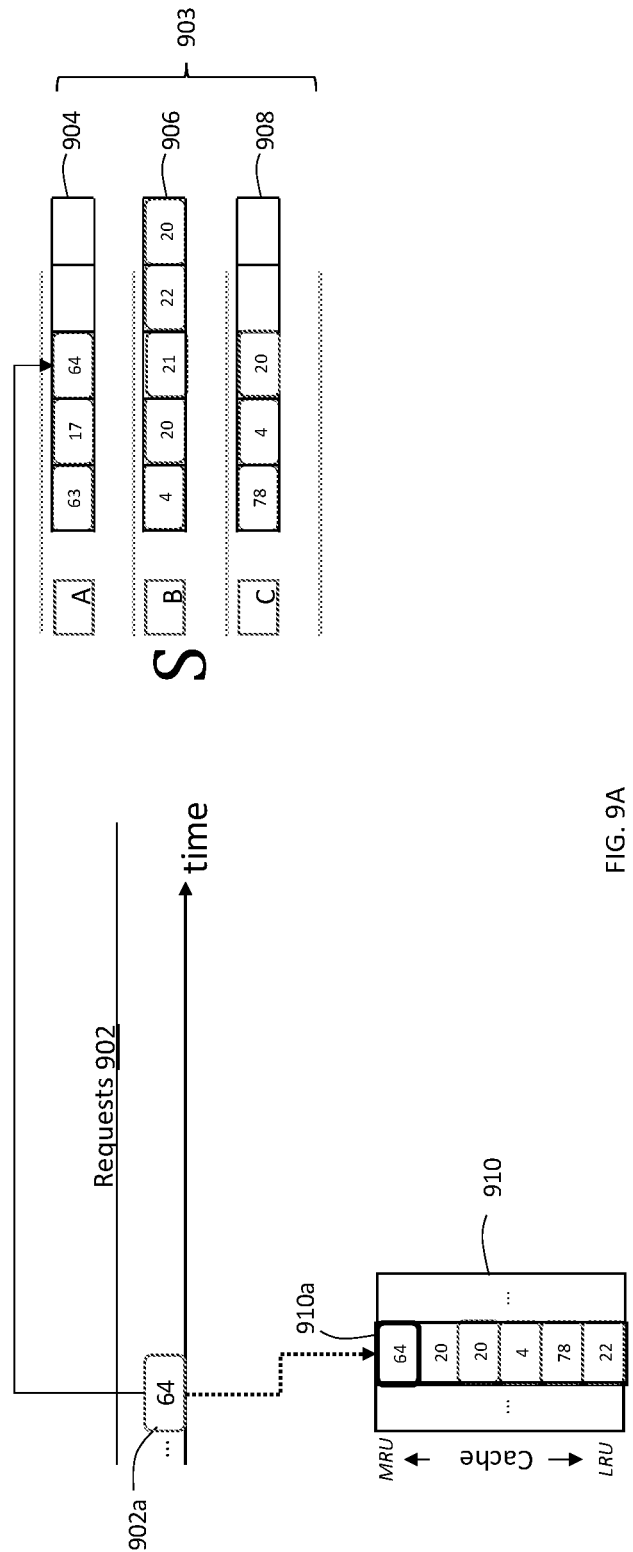
FIGS. 9A-9C illustrates examples of determining whether to pre-fetch data for a logical storage unit based on a collective sequential proximity of most recent read requests for the logical storage unit, according to embodiments of the invention.
Figure 9B:
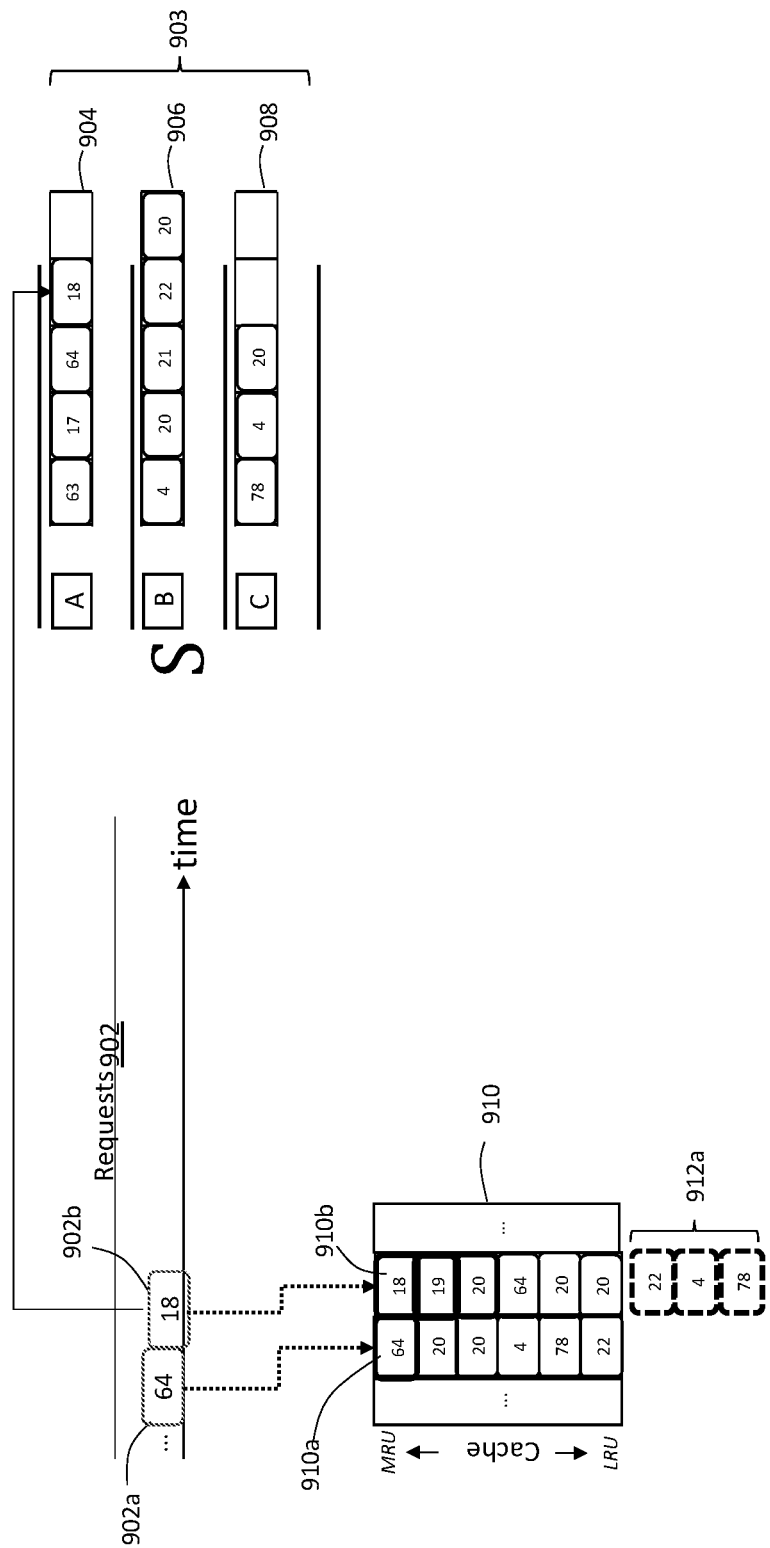
Figure 9C:
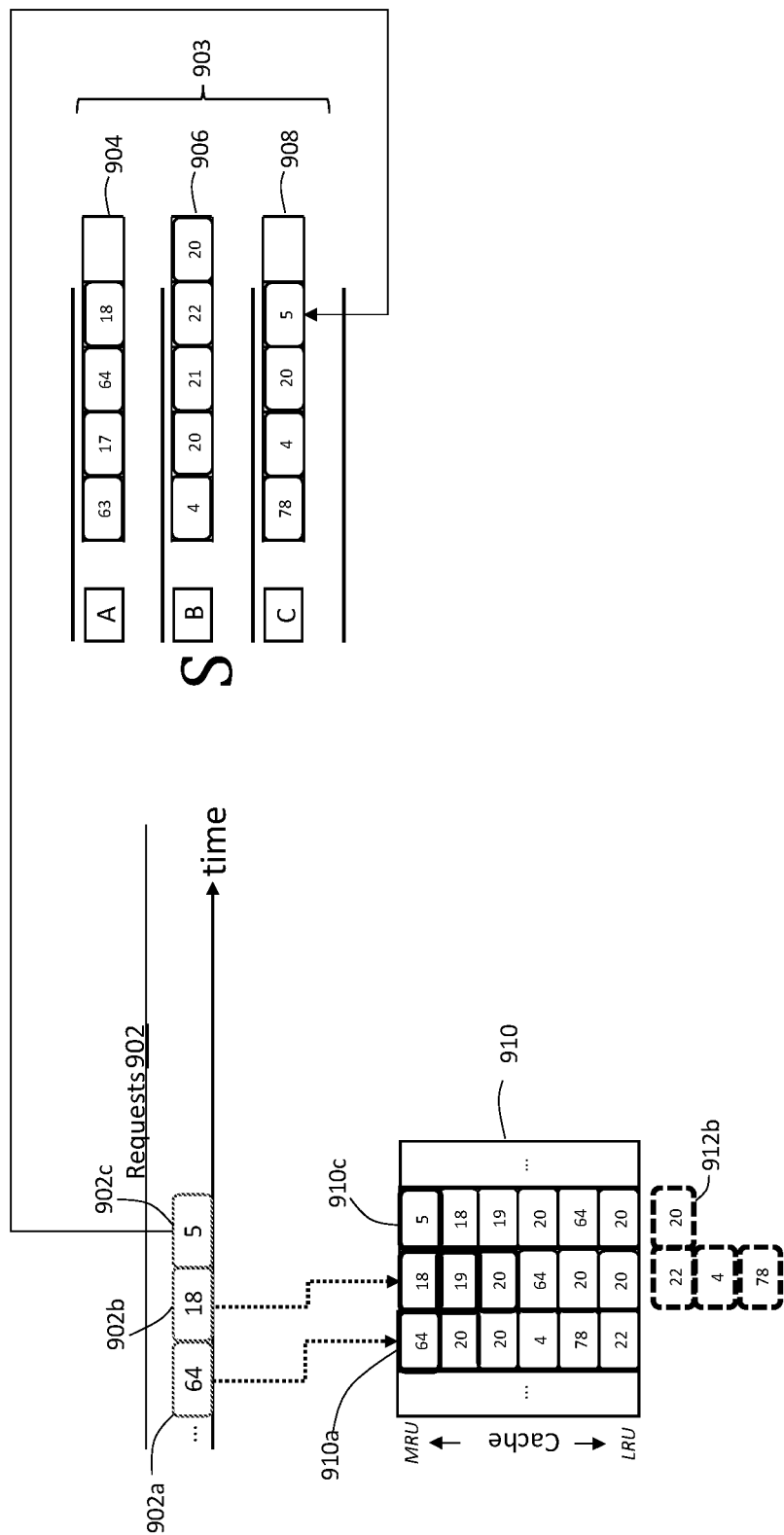

FIGS. 9A-9C illustrates examples of determining whether to pre-fetch data for a logical storage unit based on a collective sequential proximity of most recent read requests for the logical storage unit, using the methods 500 and 700 described herein. In FIGS. 9A-9C, section 910 represents a state of a cache over time, and LATV=2, PTV=0.5 and LAV=2.

FIG. 9A illustrates the state 910a of the cache and MRP table 903 after processing a page request 902a. In the embodiment of FIG. 9A, a MRP entry 904 for LSU A is updated in response to the page request 902a, and the page corresponding to page request 910 is fetched into cache 910a as shown.

FIG. 9B illustrates the state 910b of the cache and MRP table 903 after processing a page request 902b for the LSU A. The MRP entry 904 for LSU A is updated in response to the page request 902b. The MRP entry 904 then has page numbers={63, 17, 64 and 18}. Sorting these page numbers per the step 505 produces sorted MRP sequence: {17, 18, 63, 64}. Applying the step 506 (e.g., the method 700) results in a proximity metric value=0.667. Per the step 508, the proximity metric value 0.667 is determined to be greater than PTV=0.5. As a result, in addition to fetching requested page 18 into cache, it is determined to pre-fetch the next two pages 19 and 20 of LSU A (because LAV=2) into cache per the step 512, resulting in updated state 910b of the cache and evicted entries 912a.

FIG. 9C illustrates the state 910c of the cache and MRP table 903 after processing a page request 902c for the LSU C. The MRP entry 908 for LSU C is updated in response to the page request 902c. The MRP entry 908 then has page numbers={78, 4, 20 and 5}. Sorting these page numbers per the step 505 produces sorted MRP sequence: {4, 5, 20, 78}. Applying the step 506 (e.g., the method 700) results in a proximity metric value=0.333. Per the step 508, the proximity metric value 0.333 is determined to be less than PTV=0.5, so it is determined to only fetch the page for page request 902c into cache (and not pre-fetch any pages of LSU C) per the step 510, resulting in updated state 910c of the cache and evicted entry 912b.

The example of FIG. 9C illustrates that, in embodiments of the invention, e.g., in accordance with the method 500 and 700, no pre-fetching is made in response to a page request for an LSU, even though a recent sequentially proximate page request for the LSU is still in the memory of the system (i.e., recorded in the MRP table). Because the proximity metric value is computed over a sequence of page requests, a recent sequential state of the LSU is considered. It is known that workloads tend to fluctuate between sequential patterns, which benefit from pre-fetching, and random (non-sequential) patterns. By using a metric that takes into account the collective sequential proximity of recent LSU read accesses, pre-fetching in response to an LSU performing a single (or relatively few) sequentially proximate access can be avoided, for example, during a workload that is predominantly random.

In some embodiments of the invention, the values of parameters: MRP size, LATV, DNV and PTV may be selected and modified to adjust pre-fetch behavior. The MRP size may be selected to relate directly to the expected lifetime of pages in the cache (e.g., the cache 28) of the storage system. By tuning the value of MRP size, it is possible to adjust the memory of the techniques of determining whether to pre-fetch on a per-LSU basis according to embodiments described herein (e.g., according to the method 700) to appropriately match the lifetime of pages in the cache.

The DNV may be selected in consideration of a ratio of the MRP size to the DNV. This ratio may control how many of the most recently requested pages of each LSU are considered when an MRP entry overflows (i.e., the MRP entry is full when a next read request specifying one or more pages, or addresses mapping to one or more pages, of the LSU is received). This ratio may be considered to relate to an inertia of the techniques described herein of determining whether to pre-fetch on a per-LSU basis. For a fixed MRP size, smaller values of the DNV may make the techniques described herein more resistant to change; that is, it may take many more sequential requests for an LSU using a technique described herein (e.g., the method 700) to determine that the LSU is now in a sequential pattern, and for the determination to be made (e.g., as a result of the step 508) that pre-fetching is to be performed. Conversely, larger values of DNV (e.g., DNV=MRP size) may reduce the inertia such that every time the MRP entry overflows, it is wiped clean; i.e., the recent page request memory of the LSU is wiped clean, which may result in the pre-fetching behavior of the LSU fluctuating rapidly.

Decreasing the PTV may increase the number of MRP sequences (e.g., of an MRP entry) considered sequentially proximate enough (i.e., having a high enough proximity metric value) to result in pre-fetching being performed for the LSU.

A typical restriction for caching policies of a storage system is the throughput limitation—that is, the system must ensure that at most n I/O operations are performed in a certain timeframe. As a simplistic example, assume that the system must ensure that at most 100 pages can be accessed in a second. It follows that if the cache policy triggers pre-fetching either too frequently or too aggressively (e.g., with large LAVs), this throughput will limit the actual number of requests processed.

Such a loss of efficiency may be unacceptable, for example, in production environments.

Hence, cache policies may benefit from a way of parametrically limiting the number of pre-fetched pages. Using techniques described herein, the number of pre-fetched pages can be parametrically limited by adjusting the LATV (and the LAV) such that less pages are pre-fetched when a prefetch operation is performed, or by limiting the number of pre-fetch operations performed, for example, by increasing the PTV.

In known pre-fetching techniques, it is determined whether to perform a pre-fetch for an LSU, by determining whether, for a current page, p, of the LSU, a predetermined number, n, of the immediately preceding pages (p-1 ... p-n) of the LSU are still in a cache of the system. If all of the predetermined number of pages are in the cache, then a pre-fetch is performed. To reduce a number of prefetch operation performed, the predetermined number, n, may be increased. However, increasing this number even slightly may cause a massive drop in the number of pre-fetch operation performed, primarily because the older pages are less likely to still be in cache due to eviction policies of the cache.

In contrast to such known pre-fetching techniques, increasing or decreasing of the PTV may allow for a fine-tuning of the number of pre-fetches. By slightly increasing the PTV, a few less pre-fetches may be made, and by decreasing the PTV slightly, a few more pre-fetches may be made.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 500 and 700, or parts thereof, may be implemented using one or more of the systems and/or data structures described in relation to FIGS. 1-3B, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage system including a cache and one or more physical storage devices, wherein data for a plurality of logical storage units is stored on the one or more physical storage devices, a method comprising:
   receiving a first read request to read a first page of a first of the plurality of logical storage units;
   for a first group of one or more most recent read requests for the first logical storage unit, the first group including the first read request and one or more most recent read requests for the logical storage unit prior to the first read request, each of the one or more most recent read requests specifying a respective second page of the first logical storage unit, determining a value of a proximity metric indicative of a collective sequential proximity of the first page and the one or more second pages within the first logical storage unit;
   determining whether to pre-fetch one or more next sequential pages to the first page of the first logical storage unit based on the value of the proximity metric;
   fetching the first page from the one or more physical storage device into the cache; and
   prefetching the one or more next sequential pages from the one or more physical storage devices into the cache only if it is determined to prefetch the one or more next sequential pages,
   wherein a predefined look-ahead value defines a number of next pages to pre-fetch for the first logical storage unit for a pre-fetch operation,
   wherein the proximity metric is based at least in part on a predefined look-ahead threshold value corresponding to the predefined look-ahead value, and
   wherein the predefined look-ahead threshold value affects a probability of performing a pre-fetch operation.

2. The method of claim 1, wherein determining whether to pre-fetch the one or more next sequential pages of the first logical storage unit includes:
   comparing the proximity metric to a predefined proximity threshold; and
   determining to pre-fetch the one or more next sequential pages if the proximity metric is greater than or equal to the predefined proximity threshold.

3. The method of claim 1,
   wherein determining the proximity metric includes:
   sorting the first group into a first sequence according to a sequential order of the first page and the one or more second pages with the first logical storage unit; and
   calculating the proximity metric value based at least in part on the sorted first group.

4. The method of claim 1, wherein the predefined look-ahead threshold value is defined to be the predefined look-ahead value.

5. The method of claim 1, further comprising:
   maintaining a data structure including one or more entries, each entry corresponding to a respective one of the plurality of logical storage units, and each entry specifying a group of most recent read requests for the respective logical storage unit corresponding to the entry,
   wherein determining the proximity metric includes accessing the data structure.

6. The method of claim 5, wherein each entry of the data structure includes one or more page fields specifying a respective value for a page of one of the one or more most recent read requests of the logical storage unit represented by the entry, up to a predefined maximum number of page field values, and
   wherein the method further comprises:
   in response to receiving the first read request, determining that a first entry of the one or more entries of the data structure already includes the predefined maximum number of page field values;
   removing one or more oldest page field values from the first entry; and
   adding a page field value representing the first page.

7. The method of claim 3, wherein determining the proximity metric further includes, for each pair of successive read requests in the first sequence:
   determining a page difference, if any, between the respective pages of the pair, and
   if there is a page difference between the respective pages:
   adding one to a page difference count;

determining whether an amount of the page difference is the same or less than the predefined look-ahead threshold value; and if the amount of the page difference is the same or less than the predefined look- ahead threshold value, adding one to a pre-fetch hit count, wherein the proximity metric value is calculated as the pre-fetch hit count divided by the page difference count.

8. A data storage system comprising:
a cache;
a plurality of logical storage units;
one or more physical storage devices on which data for the logical storage units is stored;
one or more processors; and
a memory comprising code stored thereon that, when executed, performs a method comprising:
receiving a first read request to read a first page of a first of the plurality of logical storage units;
for a first group of one or more most recent read requests for the first logical storage unit, the first group including the first read request and one or more most recent read requests for the logical storage unit prior to the first read request, each of the one or more most recent read requests specifying a respective second page of the first logical storage unit, determining a value of a proximity metric indicative of a collective sequential proximity of the first page and the one or more second pages;
determining whether to pre-fetch one or more next sequential pages to the first page of the first logical storage unit based on the value of the proximity metric;
fetching the first page from the one or more physical storage device into the cache; and
prefetching the one or more next sequential pages from the one or more physical storage devices into the cache only if it is determined to prefetch the one or more next sequential pages,
wherein a predefined look-ahead value defines a number of next pages to pre-fetch for the first logical storage unit for a pre-fetch operation,
wherein the proximity metric is based at least in part on a predefined look-ahead threshold value corresponding to the predefined look-ahead value, and
wherein the predefined look-ahead threshold value affects a probability of performing a pre-fetch operation.

9. The data storage system of claim 8, wherein determining whether to pre-fetch the one or more next sequential pages of the first logical storage unit includes:
comparing the proximity metric to a predefined proximity threshold; and
determining to pre-fetch the one or more next sequential pages if the proximity metric is greater than or equal to the predefined proximity threshold.

10. The data storage system of claim 8,
wherein determining the proximity metric includes:
sorting the first group into a first sequence according to a sequential order of the first page and the one or more second pages with the first logical storage unit; and
calculating the proximity metric value based at least in part on the sorted first group.

11. The data storage system of claim 8, wherein the predefined look-ahead threshold value is defined to be the predefined look-ahead value.

12. The data storage system of claim 8, the method further comprising:
maintaining a data structure including one or more entries, each entry corresponding to a respective one of the plurality of logical storage units, and each entry specifying a group of most recent read requests for the respective logical storage unit corresponding to the entry,
wherein determining the proximity metric includes accessing the data structure.

13. The data storage system of claim 12, wherein each entry of the data structure includes one or more page fields specifying a respective value for a page of one of the one or more most recent read requests of the logical storage unit represented by the entry, up to a predefined maximum number of page field values, and
wherein the method further comprises:
in response to receiving the first read request, determining that a first entry of the one or more entries of the data structure already includes the predefined maximum number of page field values;
removing one or more oldest page field values from the first entry; and
adding a page field value representing the first page.

14. The system of claim 10, wherein determining the proximity metric further includes, for each pair of successive read requests in the first sequence:
determining a page difference, if any, between the respective pages of the pair, and if there is a page difference between the respective pages:
adding one to a page difference count;
determining whether an amount of the page difference is the same or less than the predefined look-ahead threshold value; and
if the amount of the page difference is the same or less than the predefined look- ahead threshold value, adding one to a pre-fetch hit count,
wherein the proximity metric value is calculated as the pre-fetch hit count divided by the page difference count.

15. One or more computer-readable media having software stored thereon for a storage system including a cache, a plurality of logical storage units and one or more physical storage devices on which data for the logical storage units is stored, the software comprising:
executable code that receives a first read request to read a first page of a first of the plurality of logical storage units;
executable code that, for a first group of one or more most recent read requests for the first logical storage unit, the first group including the first read request and one or more most recent read requests for the logical storage unit prior to the first read request, each of the one or more most recent read requests specifying a respective second page of the first logical storage unit, determines a value of a proximity metric indicative of a collective sequential proximity of the first page and the one or more second pages;
executable code that determines whether to pre-fetch one or more next sequential pages to the first page of the first logical storage unit based on the value of the proximity metric;
executable code that fetches the first page from the one or more physical storage devices into the cache; and
executable code that prefetches the one or more next sequential pages from the one or more physical storage into the cache only if it is determined to prefetch the one or more next sequential pages, wherein a predefined look-ahead value defines a number of next pages to pre-fetch for the first logical storage unit for a pre-fetch operation, wherein the proximity metric is based at least in part on a predefined look-ahead threshold value corresponding to the predefined look-ahead value, and wherein the predefined look-ahead threshold value affects a probability of performing a pre-fetch operation.

16. The one or more computer-readable media of claim 15, wherein the executable code that determines whether to pre-fetch the one or more next sequential pages of the first logical storage unit includes:

executable code that compares the proximity metric to a predefined proximity threshold; and executable code that determines to pre-fetch the one or more next sequential pages if the proximity metric is greater than or equal to the predefined proximity threshold.

17. The one or more computer-readable media of claim 15, wherein executable code that determines the proximity metric includes:

executable code that sorts the first group into a first sequence according to a sequential order of the first page and the one or more second pages with the first logical storage unit;

executable code that, for each pair of successive read requests in the first sequence:

determines a page difference, if any, between the respective pages of the pair, and if the amount of the page difference is the same or less than the look-ahead value, adds one to a pre-fetch hit count; and executable code that calculates the proximity metric value based at least in part on the sorted first group as the pre fetch hit count divided by the page difference count.

18. The one or more computer-readable media of claim 15, wherein the predefined look-ahead threshold value is defined to be the predefined look-ahead value.

19. The one or more computer-readable media of claim 15, the software further comprising:

executable code that maintains a data structure including one or more entries, each entry corresponding to a respective one of the plurality of logical storage units, and each entry specifying a group of most recent read requests for the respective logical storage unit corresponding to the entry, wherein determining the proximity metric includes accessing the data structure.

20. The one or more computer-readable media of claim 19, wherein each entry of the data structure includes one or more page fields specifying a respective value for a page of one of the one or more most recent read requests of the logical storage unit represented by the entry, up to a predefined maximum number of page field values, and wherein the software further comprises:

executable code that, in response to receiving the first read request, determines that a first entry of the one or more entries of the data structure already includes the predefined maximum number of page field values;

executable code that removes one or more oldest page field values from the first entry; and executable code that adds a page field value representing the first page.

* * * * *

UNITED STATES PATENT AND TRADEMARK OFFICE
CERTIFICATE OF CORRECTION

| | |
|---|---|
| PATENT NO. | : 10,977,177 B2 |
| APPLICATION NO. | : 16/508347 |
| DATED | : April 13, 2021 |
| INVENTOR(S) | : Vinicius Gottin et al. |

It is certified that error appears in the above-identified patent and that said Letters Patent is hereby corrected as shown below:

In the Claims

Column 25, Line 3:
In Claim 7, "as the pre fetch hit count divided by the page difference count" should be deleted.

Signed and Sealed this
Nineteenth Day of April, 2022

Katherine Kelly Vidal
*Director of the United States Patent and Trademark Office*